United States Patent
Liubakka et al.

(10) Patent No.: US 8,252,084 B2
(45) Date of Patent: Aug. 28, 2012

(54) SEPARATOR AND CRUSHER OF MINERALS WITH MICROWAVE ENERGY AND METHOD THEREOF

(75) Inventors: Gary M. Liubakka, Hibbing, MN (US); Timothy L. Sullivan, Nashwauk, MN (US); Daniel E. Lamphere, Hibbing, MN (US); Gary J. Corradi, Hibbing, MN (US); Kendall J. Dykhuis, Hibbing, MN (US)

(73) Assignee: Phoenix Environmental Reclamation, Hibbing, MN (US)

( * ) Notice: Subject to any disclaimer, the term of this patent is extended or adjusted under 35 U.S.C. 154(b) by 0 days.

(21) Appl. No.: 12/761,361

(22) Filed: Apr. 15, 2010

(65) Prior Publication Data

US 2010/0263482 A1    Oct. 21, 2010

Related U.S. Application Data

(60) Provisional application No. 61/169,563, filed on Apr. 15, 2009.

(51) Int. Cl.
*C22B 4/08*    (2006.01)

(52) U.S. Cl. .................. 75/10.13; 75/10.62

(58) Field of Classification Search .......... 75/10.13
See application file for complete search history.

(56) References Cited

U.S. PATENT DOCUMENTS

| | | | |
|---|---|---|---|
| 2,946,657 A | 7/1960 | Reynolds, Jr. |
| 3,992,287 A | 11/1976 | Rhys |
| 4,313,573 A | 2/1982 | Goldberger et al. |
| 4,321,089 A | 3/1982 | Kruesi et al. |
| 4,324,582 A | 4/1982 | Kruesi et al. |
| 4,376,034 A | 3/1983 | Wall |
| 4,419,214 A | 12/1983 | Balint et al. |
| 4,655,276 A | 4/1987 | Bird et al. |
| 4,880,578 A | 11/1989 | Holcombe et al. |
| 5,003,144 A | 3/1991 | Lindroth et al. |
| 5,211,923 A | 5/1993 | Harkness et al. |
| 5,280,149 A | 1/1994 | Schneider et al. |
| 5,393,320 A | 2/1995 | Gomez |
| 5,397,530 A | 3/1995 | Narasimhan et al. |
| 5,824,133 A | 10/1998 | Tranquilla |
| 5,858,037 A | 1/1999 | Sukumaran Jayan et al. |

(Continued)

FOREIGN PATENT DOCUMENTS

CN    1749421    3/2006

OTHER PUBLICATIONS

Chen et al. "The Relative Transparency of Minerals to Micrwowave Radiation." Canadian Metallurgical Quarterly. vol. 23, No. 3, pp. 349-351. 1984.*

(Continued)

*Primary Examiner* — George Wyszomierski
*Assistant Examiner* — Tima M McGuthry Banks
(74) *Attorney, Agent, or Firm* — Dicke, Billig & Czaja, PLLC

(57) ABSTRACT

One aspect provides for the separating of two or more joined materials by heating with microwaves, thereby producing differential thermal expansion of the materials. The pieces to be treated are exposed to microwave energy, producing differing rates of heating, and therefore expansion, of the differing materials making up the treated pieces of material. The differential thermal expansion of the differing materials will cause sufficient strain to separate the differing materials. Separation can be enhanced in some cases by following microwave heating with rapid cooling of the treated material.

7 Claims, 2 Drawing Sheets

U.S. PATENT DOCUMENTS

| | | | |
|---|---|---|---|
| 5,911,885 | A | 6/1999 | Owens |
| 6,104,015 | A | 8/2000 | Jayan et al. |
| 6,211,499 | B1 | 4/2001 | Morrow et al. |
| 6,277,168 | B1 | 8/2001 | Huang et al. |
| 6,712,298 | B2 | 3/2004 | Kohlberg et al. |
| 6,923,328 | B2 | 8/2005 | Birken |
| 7,459,006 | B2 | 12/2008 | Ridler |
| 7,476,829 | B2 * | 1/2009 | Kingman ............... 219/695 |
| 2010/0263483 | A1 | 10/2010 | Liubakka |
| 2010/0264136 | A1 | 10/2010 | Liubakka |
| 2010/0264241 | A1 | 10/2010 | Liubakka |

OTHER PUBLICATIONS

Vorster et al. "The Effect of Microwave Radiation upon the Processing of Neves Corvo Copper Ore". International Journal of Mineral Processing. Volume 63, pp. 29-44. 2001.* decrepitation. (n.d.). Dictionary.com Unabridged. Retrieved Feb. 21, 2012, from Dictionary.com website: http://dictionary.reference.com/browse/decrepitation.*

The Notice of Allowance for U.S. Appl. No. 12/761,362 mailed Jul. 21, 2011 (14 pages).

* cited by examiner

SEPARATOR AND CRUSHER OF MINERALS WITH MICROWAVE ENERGY AND METHOD THEREOF

CROSS-REFERENCE TO RELATED APPLICATIONS

This patent application claims priority under 35 U.S.C. §119(e) to U.S. Provisional Patent Application Ser. No. 61/169,563 entitled "RECLAMATION SYSTEM," having a filing date of Apr. 15, 2009 and is incorporated herein by reference. This Patent Application is also related to Utility Patent Application filed on even date herewith, entitled "SYSTEM AND METHOD FOR RECOVERING MINERALS" having application Ser. No. 12/761,362.

BACKGROUND

One aspect relates to separating, and/or reducing in size, particles of solid material via heating with microwave energy.

Throughout the world, there are quantities of minerals combined with other material. Often, attempts are made to separate materials. For example, ores are treated by mechanical, chemical, or thermal processes, or some combination thereof to liberate marketable minerals from waste minerals (called gangue).

In many mining districts enormous quantities of mineral reserves are not utilized because mining and/or mineral processing to recover the marketable constituents is uneconomical. Most of this material is not utilized because separation of the desired minerals from the gangue minerals is too expensive. Additional quantities of otherwise desired minerals are locked to gangue minerals and are rejected during mining or mineral processing and are sent to stockpiles or tailing basins.

Billions of tons of mined and unmined minerals and additional materials now disposed of in stockpiles, tailing basins, and landfills would be utilized if processing costs for separating gangue from valuable minerals were significantly reduced.

For these and other reasons, there is a need for the present embodiments.

SUMMARY

A particle composed of two or more joined materials, said materials having different rates of microwave energy absorption, and/or different coefficients of thermal expansion, are exposed to microwaves in a batch or continuous process. The materially distinct components of the particle will absorb more or less microwave energy than adjacent material(s) in the particle, and will physically expand at different rates as they are heated. Differential thermal expansion will cause physical separation at the common surfaces of the differing materials, allowing subsequent complete separation.

In areas where complete separation of materials does not occur, or in more homogeneous materials, differential heating will still take place, and if it does not cause complete breakage of the particle, it will often cause stress cracking and micro-cracking, which reduces energy requirements for subsequent breakage of the particle by other means.

Differential thermal expansion can be assisted by cooling particles prior to heating, or by subjecting the heated particles to additional thermal shock e.g. by dumping into cold water.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
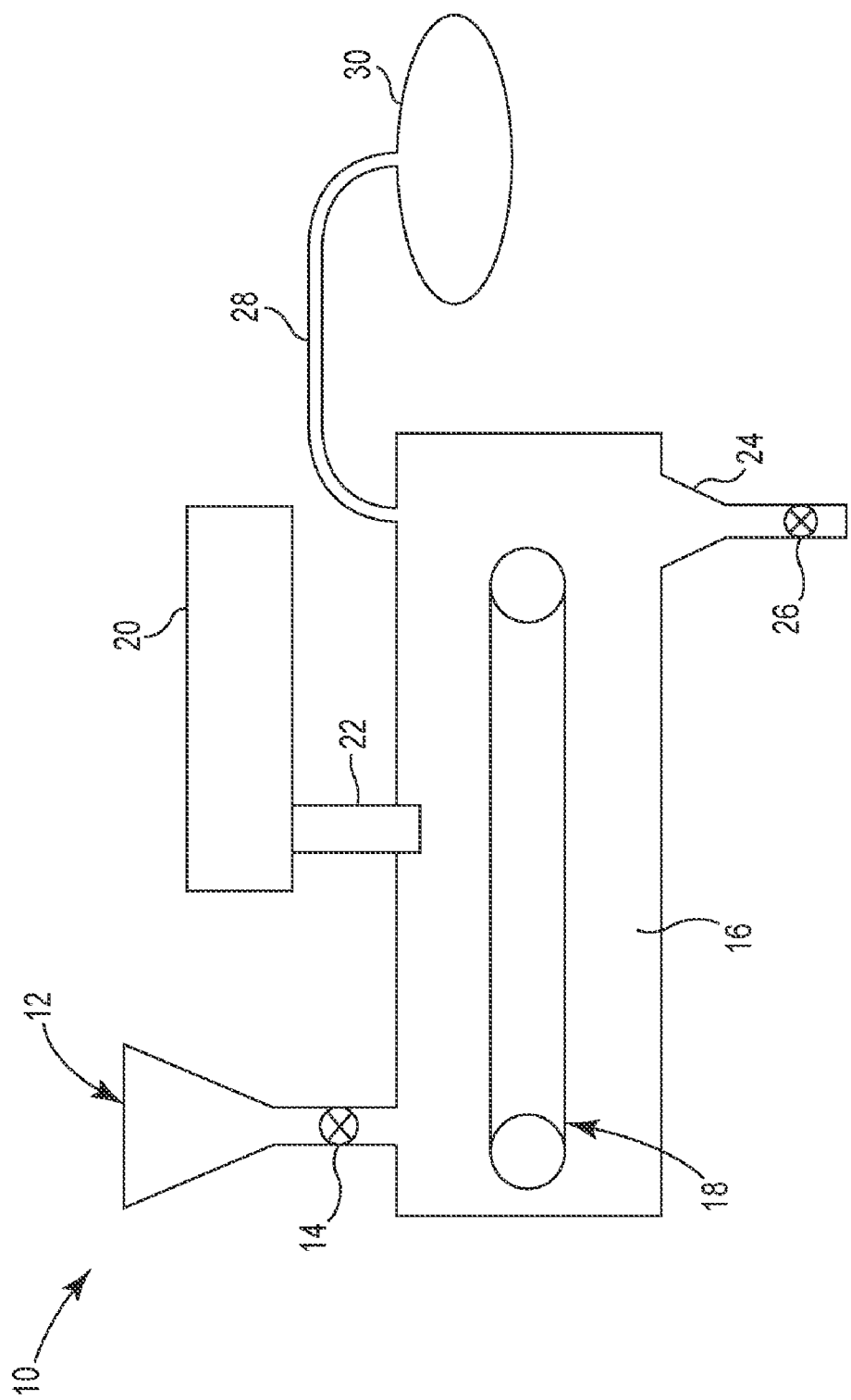
FIG. 1 illustrates a length-wise cross-sectional view of a silica cracking microwave oven in accordance with one embodiment.

FIG. 1 is a microwave oven 10 in accordance with one embodiment. In one exemplary embodiment, microwave oven 10 is used for "silica cracking" or for the separation of iron ore composed of silica and magnetite. In one embodiment, microwave oven 10 includes an entry gate 12, entry valve 14, main vessel 16, conveyer 18, microwave source 20, waveguide 22, exit gate 24, exit valve 26, exhaust pipe 28 and recovery system 30.

In one embodiment, microwave oven 10 is configured to separate quartz from iron ore in pieces of waste rock that contain both materials aggregated together. In one case, microwave oven 10 is configured to cause the decrepitation of iron ore and bonded minerals like quartz. In a process using microwave oven 10, not only is the iron ore separated from the quartz, but some of the differential thermal expansion, which results in breaking apart the quartz and iron ore, also creates fractures and micro-fractures in the iron ore that eases crushing and grinding of the ore in later processing.

In one embodiment, feed materials such as waste rock composed of iron ore and quartz is introduced to microwave oven 10 at entry gate 12. Entry valve 14 is then actuated to controllably allow the minerals into main vessel 16 of oven 10. In one embodiment, vessel 16 of microwave oven 10 is enclosed in order to control the atmosphere inside the operating vessel 16. For example, in one embodiment, operating vessel 16 is a stainless steel vessel that is sealed sufficiently to prevent microwave radiation leakage. It is further configured to contain dust, gases, and vapors produced during processing.

In one embodiment, entry gate 12 is oriented such that feed materials are deposited from gate 12 onto conveyor 18 within vessel 16. Conveyer 18 then conveys feed materials from a first location adjacent entry gate 12 such that they pass under waveguide 22. Waveguide 22 is coupled to microwave source 20 such that microwaves from source 20 are directed via waveguide 22 at the feed materials on conveyer 18 as they pass underneath.

In one embodiment, the directed microwaves sufficiently heat the feed materials such that separation is induced between the silica and magnetite ore fractions. The fractured material is dumped from conveyor 18 into exit gate 24, where it can be controllably removed via exit valve 26 for further processing. Vapors and gases that are generated by the process are removed via exhaust pipe 28 and treated by recovery system 30. Recovery system 30 is configured to control emissions from the processing of feed materials within oven 10.

In one embodiment, the microwave energy delivered to the feed materials is at least 1000 watts for at least three seconds. In one embodiment, the microwave energy delivered to the feed materials is of constant frequency of 2.45 GHz. In yet another embodiment, the microwave energy is of varied frequency form 300 megahertz to 300,000 megahertz.

In one embodiment, the atmosphere inside vessel 16 is controlled in conjunction with the process of heating the feed materials with microwave energy. For example, in one embodiment where processing of relatively inert, nonreactive, and nonhazardous material is done, vessel 16 is controlled such that the pressure within the vessel is at atmospheric pressure. To control emissions where processed materials would react with the ambient atmosphere to create noxious emissions (for example, $SO_x$ from sulfide ores) the vessel 16 may be given an inert atmosphere or run under vacuum, and emissions treated by recovery system 30. In yet another embodiment, a pressurized environment is induced within vessel 16 to control the internal atmosphere and exclude ambient air from entering vessel 16. In another embodiment, an oxidizing atmosphere is induced within vessel 16, for example, to oxidize minerals containing sulphur, such as pyrite ($FeS_2$), and remove the resultant $SO_2$ with recovery system 30. In another embodiment, a reducing atmosphere or an inert atmosphere is induced within vessel 16, for example, to prevent the oxidation of sulphur in pyrite as it is heated and exposed to the interior atmosphere during processing. In another embodiment vessel 16 is pressurized to increase the efficiency of ultrasound energy used to assist in fracturing feed materials.

Figure 2:
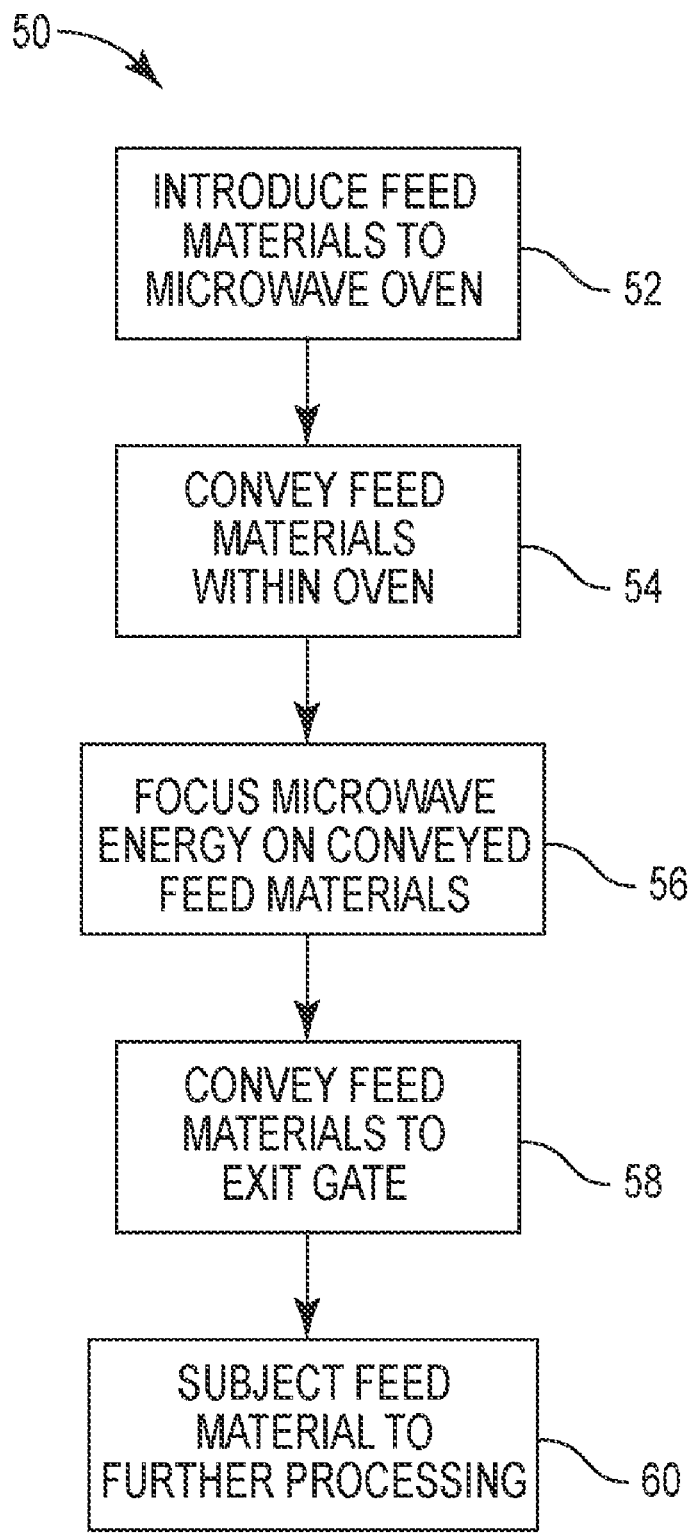
FIG. 2 is a flow diagram illustrating a material treatment process in accordance with one embodiment.

FIG. 2 is a flow diagram illustrating a mineral treatment process 50 in accordance with one embodiment. In process 50, feed materials are introduced to an oven, such as microwave oven 10 above, via a hopper and gate at step 52. Once inside the oven, the feed materials are conveyed on a conveyor, such as conveyer 18 above, at step 54. The feed materials are then moved past a waveguide that focuses microwave energy onto the feed materials at step 56.

In one embodiment, the microwaves are generated from a magnetron, such as magnetron 20 above, and then focused at the feed materials via a waveguide. As the feed materials are moved past the waveguide, they absorb the focused microwaves and heat up. In one embodiment, the feed materials include iron ore components joined to quartz components. In that example, the iron ore component of the feed absorbs the majority of the microwaves and heats rapidly. The quartz absorbs much less microwave energy. The iron ore expands much more than the quartz and breaks free where the two materials are joined.

In one embodiment, the microwaves are generated from a magnetron, such as magnetron 20. In one embodiment, microwaves generated from magnetron 20 are in the range from 300 megahertz to 300,000 megahertz.

In one embodiment, magnetron 20 is controlled to induce thermal runaway in the feed materials within vessel 16. In one case, thermal runaway arises when the power dissipation in small elemental volumes within the feed material particles exceeds the rate of heat transmission to its surroundings, so that the rate of increase of enthalpy is greater than its surroundings. The temperature increases at a faster rate in the feed materials than in the surroundings.

Often, there is arcing created in the feed materials when thermal runaway is induced. Despite the arcing created in the materials, which is typically not a desired effect, the induced thermal runaway causes rapid heating in the feed materials and thereby breaking and micro-fracturing in the feed material particles due to differential thermal expansion.

At step 58 the microwave-treated materials are then dropped from the conveyor into an exit gate for removal from the oven. In one embodiment, at a step 60 the microwave-treated materials are removed for further processing. In one embodiment, iron ore that is treated by process 50, and steps 52-58, is largely freed from its original quartz fraction. In addition, process 50 also produces internal fractures and micro-cracking in the iron ore that reduce the energy needed to crush or grind the ore in later processing.

As such, in some embodiments, the quartz is more violently detached from the iron ore by further processing 60, such as dropping the microwave-treated iron ore into cold water, causing more complete separation of the materials. In other embodiments, further processing 60 includes subjecting the microwave-treated iron ore to thermal shock or ultrasound energy to cause further separation. In some embodiments, ultrasound energy can be generated within vessel 16 such that after, or even simultaneously with, the microwave heating, the feed materials are then subjected to ultrasound energy. In one example, the ultrasound energy is in the frequency range of 16,000 hertz and higher.

In accordance with embodiments, feed materials can be introduced to a microwave oven such as oven 10. Feed materials introduced into the zone of microwave energy are stressed so as to facilitate separation into constituent parts and/or be reduced in size. The exposure to microwave energy is made sufficient to cause differential thermal expansion (e.g. mm per m per degree C., or cc per L per degree C.) among differing materials within individual particles, grains, or pieces of the material being treated. The differential thermal expansion is intended to cause physical failure throughout the particle, grain, or piece being treated.

Microwave oven 10 creates differential thermal expansion in the feed materials via heating with microwaves. In one embodiment, differential thermal expansion is achieved by ensuring the two or more differing materials making up the feed materials or treated particle, grain, or piece have sufficiently different rates of microwave energy absorption, such that one material is transparent to microwave energy relative to the adjacent material. Such materials will absorb microwave energy at different rates, resulting in respectively different rates of heating and expansion.

In another embodiment, adjacent materials of differing composition may absorb the same quantities of microwave energy, but their rates of thermal expansion are sufficiently different that each material expands at significantly different rates, though their internal temperatures during and after exposure to the microwaves may be similar.

In other embodiments, feed materials can have both different rates of microwave energy absorption and different rates of thermal expansion. In the embodiments, a great enough difference in physical expansion of adjacent materials is created to overcome the chemical, atomic, or physical forces binding them together, causing physical failure.

In some embodiments, the physical failure will be so complete as to cause separation of the differing constituent materials within the particle, grain, or piece, one from another. In some cases physical failure will result in breakage of the particle, grain, or piece into smaller particles, grains, or pieces of composition similar to the parent particles, grains, or pieces. In some cases physical failure will occur as fracturing or micro-fracturing of the particle, grain, or piece. In some cases physical failure will occur in combinations of the preceding described modes. In some cases, the microwave energy causes dissolution, decrepitation, or disintegration of one or more of the constituent materials of the feed materials.

If the objective is to separate differing materials found within single particles, grains, or pieces, such as quartz bound to magnetite, the two materials can be made to split apart entirely, into particles, grains, or pieces composed or entirely or predominantly of one material (e.g. quartz) or the other (e.g. magnetite).

If the objective is to reduce particles, grains, or pieces in size, such as with a relatively homogenous iron ore composed of hematite and magnetite, even though the particles, grains, or pieces may not separate completely into separate components of hematite and magnetite, internal stresses caused by differential thermal expansion will cause either complete fracture, resulting in smaller particles, grains, or pieces; or, though the particles, grains, or pieces remain unbroken, differential thermal expansion will induce fractures and micro-fractures that will reduce the energy required for further size reduction via more traditional means. In one embodiment, microwave oven 10 is used to crush and/or separate ores within a waste stockpile, such as Oolitic Iron ore, Ferruginous Chert (Silicified hematite/magnetite mix), Banded Iron Formation (Silicified hematite/magnetite mix), Cretaceous Pebbles (Silicified hematite/magnetite mix), Taconite (Magnetite, hematite, and $SiO_2$), Natural Iron Ore (hematite), Dunka Pit type (Fe sulfides, hematite, magnetite), and Gold bearing Quartz (Au, Ag in $SiO_2$ matrix).

In one embodiment, microwave oven 10 is used to crush and/or separate minerals such as Bauxite (Al hydroxides), Kaolinite ($Al_2Si_2O_5(OH)_4$), Kyanite ($Al_2SiO_5$), Andalusite ($Al_2SiO_5$), Topaz ($Al_2SiO_4(F,OH)_2$), Sillimanite ($Al_2SiO_5$), Corundum ($Al_2O_3$), Orpiment ($As_2S_3$), Realgar (AsS), Barite ($BaSO_4$), Witherite ($BaCO_3$), Borax ($Na_2B_4O_5(OH)_4$-$8H_2O$), Tourmaline (B(Na—Ca—Al—Mg—Fe—Mn) silicate), Beryl ($Be_3Al_2(Si_6O_{18})$), Calcite ($CaCO_3$), Gypsum ($CaSO_4$—$2H_2O$), Dolomite ($CaMg(CO_3)_2$), Anhydrite ($CaSO_4$), Stilbite ($CaAl_2Si_7O_{18}$-$7H_2O$), Aragonite ($CaCO_3$), Apatite ($Ca_5(PO_4)_3(F, Cl, OH)$), Epidote ($Ca_2(Al, Fe)Al_2O(SiO_4)$—$(Si_2O_7)(OH)$), Malachite ($Cu_2CO_3(OH)_2$), Chrysocolla ($Cu_4H_4Si_4O_{10}(OH)_8$), Bornite ($Cu_5FeS_4$), Chalcopyrite ($CuFeS_2$), Pyrrhotite ($Fe_{1-x}S$), Magnetite ($Fe_3O_4$), Hematite ($Fe_2O_3$), Arsenopyrite (FeAsS), Siderite ($FeCO_3$), Chromite ($FeCr_2O_4$), Pyrite ($FeS_2$), Marcasite ($FeS_2$), Ilmenite ($FeTiO_3$), Wolframite ($(Fe,Mn)WO_4$), Goethite (aFeO(OH)), Limonite (Fe—$OHnH_2O$), Staurolite ($Fe_2A_{19}O_6(SiO_4)_4$—$(O, OH)_2$), Cinnabar (HgS), Muscovite (KAl hydrated silicate), Biotite (KMg hydrated silicate), Talc (Mg hydrate), Chlorite (MgFe hydrate), Serpentine ($Mg_3Si_2O_5(OH)_4$), Magnesite ($MgCO_3$), Spinel ($MgAl_2O_4$), Manganite (MnO(OH)), Pyrolusite ($MnO_2$), Molybdenite ($MoS_2$), Halite (NaCl), Natrolite ($Na_2Al_2Si_3O_{10}2H_2O$), Galena (PbS), Anglesite ($PbSO_4$), Cerussite ($PbCO_3$), Stibnite ($Sb_2S_3$), Quartz ($SiO_2$), Opal ($SiO_2$—$nH_2O$), Cassiterite ($SnO_2$), Celestite ($SrSO_4$), Strontianite ($SrCO_3$), Rutile ($TiO_2$), Sphalerite (ZnS), Hemimorphite ($Zn_4(Si_2O_7)(OH)_2$—$H_2O$), Smithsonite ($ZnCO_3$), and Zircon ($ZrSiO_4$).

In one embodiment, microwave oven 10 is used to crush and/or separate igneous rock within a waste stockpile, such as granite, gabbro, basalt; sedimentary rock such as conglomerate, sandstone, shale, limestone, iron formation; metamorphic rock such as slate, marble, gneiss, quartzite; and various other rocks.

In one embodiment, microwave oven 10 is configured as a portable system. In one example, each of the components microwave oven 10 is configured compact enough to be carried on rail cars, such as one or more cars of a train, such that microwave oven 10 can be rolled over a rail directly to a waste stockpile for processing thereof.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of separating minerals comprising:
introducing aggregated minerals into a microwave oven, wherein the aggregated minerals consists of at least a first and a second mineral bound together, the first and second minerals each having different differential thermal expansion rates;
conveying the aggregated minerals past a waveguide;
energizing a magnetron to generate microwave energy into the waveguide and focusing the microwave energy onto the aggregated minerals using the waveguide such that the aggregated minerals are heated rapidly such that fractures are induced in the bonded aggregated minerals due to the different differential thermal expansion rates;
wherein the microwave energy delivered to the aggregated minerals is at least 1000 watts for at least three seconds.

2. The method of claim 1, wherein the first mineral consists of iron ore and the second mineral consists of quartz, such that the rapid heating causes fractures and micro-fractures in the iron ore and quartz thereby easing crushing and grinding of the iron ore and quartz in later processing.

3. The method of claim 1, wherein the first mineral consists of iron ore and the second mineral consists of quartz, such that the rapid heating causes the breaking apart of the quartz and the iron ore due to their different differential thermal expansion rates.

4. The method of claim 1, wherein the microwave energy is of constant frequency of 2.45 GHz.

5. The method of claim 1, wherein the microwave energy is of varied frequency of 300 megahertz to 300,000 megahertz.

6. The method of claim 1, further comprising, after focusing the microwave energy onto the aggregated minerals, subjecting the aggregated minerals to one or more sources of thermal shock and ultrasound energy.

7. The method of claim 1, further comprising controlling the magnetron to induce thermal runaway in the aggregated minerals thereby breaking and micro-fracturing the aggregated minerals due to differential thermal expansion.

* * * * *